United States Patent [19]

Wada

[11] Patent Number: 4,459,520
[45] Date of Patent: Jul. 10, 1984

[54] DRIVING CIRCUIT FOR A D.C. COMMUTATORLESS MOTOR

[75] Inventor: Kinzo Wada, Yokohama, Japan

[73] Assignee: Victor Company of Japan, Ltd., Japan

[21] Appl. No.: 498,153

[22] Filed: May 25, 1983

[30] Foreign Application Priority Data

Jun. 4, 1982 [JP] Japan .................................. 57-95898

[51] Int. Cl.³ .......................................... H02K 29/04
[52] U.S. Cl. .................................... 318/254; 318/138; 318/439
[58] Field of Search .................... 318/254, 254 A, 138, 318/439, 327, 653

[56] References Cited

U.S. PATENT DOCUMENTS 4,135,120 1/1979 Hoshimi et al. ..................... 318/138
4,376,261 3/1983 Heide et al. ........................ 318/138 X Primary Examiner—B. Dobeck
Assistant Examiner—Bentsu Ro
Attorney, Agent, or Firm—Andrus, Sceales, Starke & Sawall

[57] ABSTRACT

A driving circuit for a D.C. commutatorless motor comprises a rotor having a permanent magnet, a pair of Hall elements stator coils positive and negative power sources, power switching elements, where each of the stator coils has one terminal thereof grounded and the other terminal thereof coupled to the positive power source through one of the power switching elements and to the negative power source through another power switching element, a differential switching circuit for switching each of output terminals of the Hall elements with a difference of approximately $\pi/2$ radians in phase by an output signal thereof, and a difference signal producing circuit coupled between the power switching elements and the differential switching circuit, for producing a signal in accordance with a difference between two output signals having a difference of approximately $\pi$ radians in phase obtained from the differential switching circuit. A current in accordance with the signal from the difference signal producing circuit is applied to the respective stator coils.

5 Claims, 7 Drawing Figures

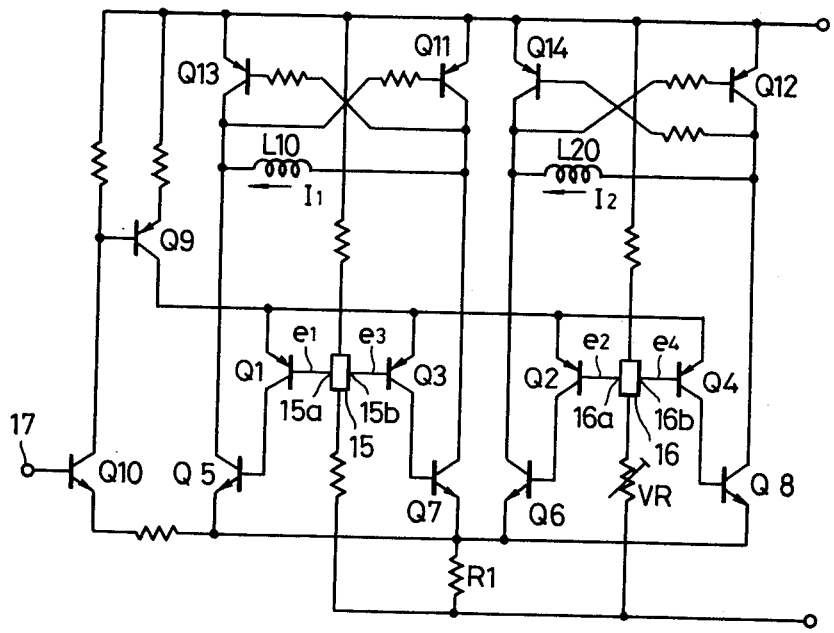
PRIOR ART FIG. 2
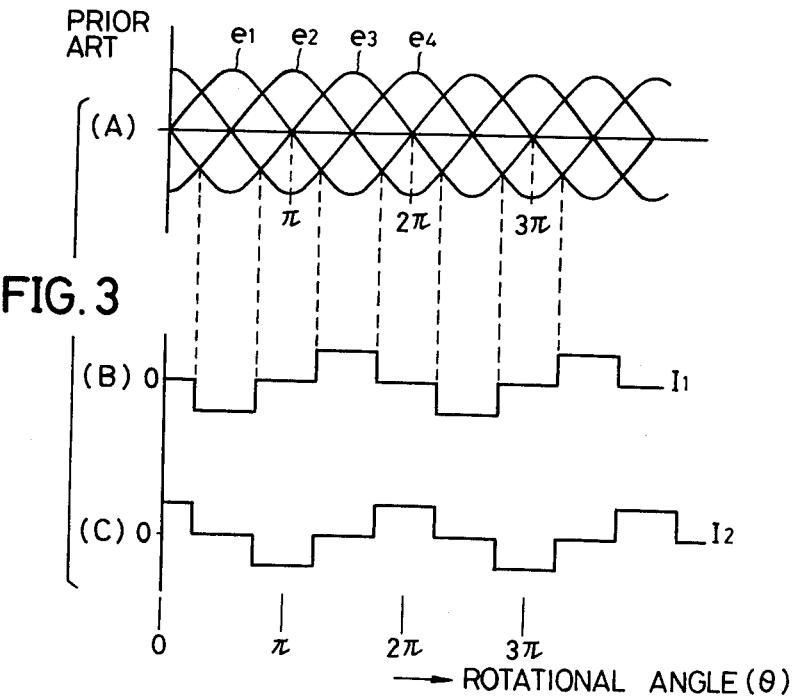
FIG. 3

DRIVING CIRCUIT FOR A D.C. COMMUTATORLESS MOTOR

BACKGROUND OF THE INVENTION

The present invention generally relates to driving circuits for D.C. commutatorless motors, and more particularly to a driving circuit for a D.C. commutatorless motor, which is designed so that a current does not unnecessarily flow through power switching elements even when the amplitude of an output signal of a rotor position detecting means is set to a small amplitude in order to prevent rapid switching of currents with respect to stator coils, the utilization efficiency of the stator coils is improved, and the number of power switching elements which are required is reduced.

As a conventional driving circuit for a D.C. commutatorless motor, there was a driving circuit designed to flow currents in only one direction with respect to four stator coils. However, this conventional driving circuit had a deficiency in that the torque obtained by driving the D.C. commutatorless motor by such a conventional driving circuit was small. Hence, as will be described hereinafter in conjunction with the drawings, there was another conventional driving circuit designed to flow currents in both forward and reverse directions with respect to the stator coils. According to this other conventional driving circuit, the utilization efficiency of the stator coils is improved compared to the former conventional driving circuit. Moreover, there was an advantage in that a large torque can be obtained by driving the D.C. commutatorless motor by the latter conventional driving circuit. On the other hand, however, the latter conventional driving circuit required eight power transistors through which large currents flow, for example, and the manufacturing cost of the driving circuit was high. Furthermore, the latter conventional driving circuit was disadvantageous in that the size of the motor became large, and a large number of processes were required to assemble the motor.

In addition, when output voltages of Hall elements are sufficiently large, the currents flowing through the stator coils are rapidly switched. However, when such switching of the currents is rapid, the rotor will not rotate smoothly. Especially when the frequency of the current switching is near the resonance point of mechanical vibration in the rotor system (rotor shaft, magnets, and the like), such phenomenon in which the rotor will not rotate smoothly becomes particularly notable. The output voltages of the Hall elements may be set to small voltages, however, in this case, the current switching with respect to the stator coils cannot be carried out in a satisfactory manner. Especially in a D.C. commutatorless motor comprising Hall elements which use indium antimonide (InSb), the Hall elements have relatively high negative temperature coefficients in relation to the output voltages thereof. Thus, in such a D.C. commutatorless motor comprising the Hall elements which use indium antimonide, the output voltages of the Hall elements decrease to the extreme degree under high ambient temperature conditions, and effects the current switching with respect to the stator coils. In this case, an interval will exist in which collector currents of switching transistors flow simultaneously, and the power source current will become large. Thus, in extreme cases, the power transistors may be destroyed, and even if the power transistors do not become destroyed, the power source efficiency of the motor will be low.

SUMMARY OF THE INVENTION

Accordingly, it is a general object of the present invention to provide a novel and useful driving circuit for a D.C. commutatorless motor, in which the problems associated with the conventional driving circuits described above have been eliminated.

Another and more specific object of the present invention is to provide a driving circuit for a D.C. commutatorless motor, designed so that two stator coils have one terminal thereof respectively grounded, each of the two stator coils has the other terminal thereof respectively connected to a positive power source through a power switching element and to a negative power source through a power switching element, two Hall elements have two output terminals thereof respectively connected to a differential switching circuit which carries out the switching with a difference of approximately $\pi/2$ radians in phase according to outputs obtained through the two output terminals thereof, difference signal producing circuits for obtaining signals in accordance with respective differences between respective two output signals of the differential switching circuits having differences of approximately $\pi/2$ radians in phase, are respectively connected between the power switching elements and the differential switching circuits, and currents in accordance with signals obtained from the difference signal producing circuits are supplied to respective stator coils. According to the driving circuit for a D.C. commutatorless motor according to the present invention, if the output signals of the Hall elements are set to small values, in a state where one Hall element opposes the N-pole or the S-pole of the rotor and the other Hall element opposes an intermediate part between the N-pole and S-pole of the rotor, a current flows through one stator coil but no current flows through the other stator coil. Accordingly, even if the angles corresponding to the intervals in which the currents flow through collectors of each of transistors in the differential switching circuits are over $\pi$ radians, the angles corresponding to the intervals in which currents flow in forward and reverse directions through the stator coils becomes less than $\pi$ radians. Hence, compared to the conventional motor which is not provided with these circuits, the utilization efficiency of the stator coils is improved according to the present invention. Moreover, when the outputs of the Hall elements are set to small values, unnecessary currents do not flow through the power switching elements, and there is no possibility of these power switching elements becoming destroyed. Further, vibrations and noise will not be generated according to the present invention, since the current switching with respect to the stator coils is carried out smoothly. In addition, compared to the conventional motor, the motor can be downsized and the cost of the motor can be reduced according to the present invention, because only four power switching elements are needed.

Other objects and further features of the present invention will be apparent from the following detailed description when read in conjunction with the accompanying drawings.

BRIEF DESCRIPTION OF THE DRAWINGS

FIG. 2 is a circuit diagram showing an example of a conventional driving circuit for a D.C. commutatorless motor;

FIG. 3 is a graph showing signal waveforms at each part of the circuit shown in FIG. 2;

DETAILED DESCRIPTION

Figure 1A:
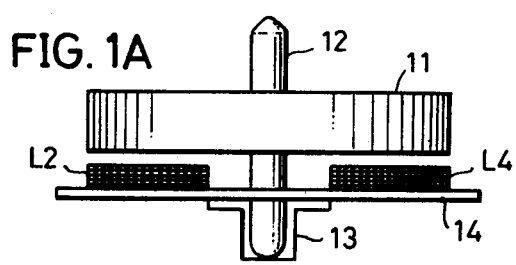
FIGS. 1A and 1B are a general plan view showing a general D.C. commutatorless motor and a diagram showing positional relationship of stator coils and Hall elements.
Figure 1B:
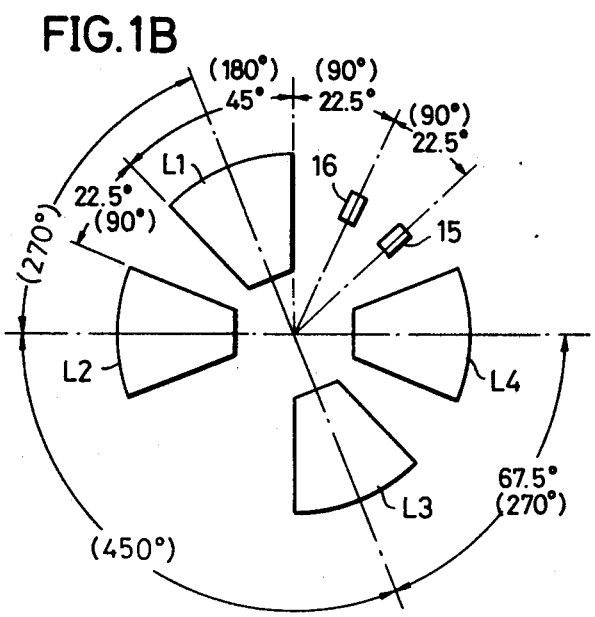

As shown in FIG. 1A, a general D.C. commutatorless motor comprises a rotor 11 including a permanent magnet having eight poles, a rotary shaft 12 fixed to the rotor 11 and axially supported by a bearing 13, and stator coils $L_1$ through $L_4$ fixed to a base plate 14. The stator coils $L_1$ through $L_4$ are provided opposing the magnetized surface of the rotor 11. The coils $L_1$ and $L_2$, and the coils $L_3$ and $L_4$, are respectively arranged with a difference of $\pi/2 \times (2N+1)$ radians in electrical angle (where $N=0, 1, 2, \ldots$), that is, $3\pi/2$ radians or a 270° phase difference, for example, as shown in FIG. 1B. On the other hand, the coils $L_2$ and $L_3$, and the coils $L_4$ and $L_1$, are respectively arranged with a difference of $\pi/2 \times (2N+1)$ radians in electrical angle, that is, $5\pi/2$ radians or a 450° phase difference, for example. Hall elements 15 and 16 are mounted onto the base plate 14 with a difference of 90 /2 radians in electrical angle, that is, a 90° phase difference. The Hall element 15 and the coil $L_4$, and the Hall element 16 and the coil $L_1$, are respectively arranged with a difference of $\pi$ radians in electrical angle, that is, a 180° phase difference. In FIG. 1B, angles shown in brackets indicate electrical angles, and angles without brackets indicate mechanical angles.

An example of a conventional driving circuit for the general D.C. commutatorless motor which has the above described construction, is shown in FIG. 2. When a current is applied to current terminals of the Hall elements 15 and 16, Hall output voltages $e_1$, $e_3$, $e_2$, and $e_4$ shown in FIG. 3(A) are respectively obtained through voltage terminals 15a, 15b, 16a, and 16b of the Hall elements 15 and 16, and applied to respective bases of transistors Q1, Q2, Q3, and Q4. The transistors Q1 through Q4 constitute a differential switching circuit, and these transistors Q1 through Q4 are respectively turned ON during a partial period corresponding to approximately $\pi/2$ of a negative voltage period of the respective Hall output voltages $e_1$ through $e_4$, that is, during a period when the voltages $e_1$ through $e_4$ respectively are lowest.

The coils $L_1$ and $L_3$ are indicated in FIG. 2 as a coil $L_{10}$ because the coils $L_1$ and $L_3$ are connected in series. The coils $L_2$ and $L_4$ are similarly indicated as a coil $L_{20}$ because the coils $L_2$ and $L_4$ are connected in series. For example, during an interval in which the rotational angle (electrical angle) $\theta$ of the rotor 11 assumes an angle between $\pi/4$ and $3\pi/4$, the voltage $e_3$ assumes the lowest value among the voltages $e_1$ through $e_4$. Thus, during this interval, transistors Q3, Q7, and Q13 are turned ON, and a current $I_1$ shown in FIG. 3(B) flows through the coil $L_{10}$ in a reverse direction (a direction opposite to the direction of the arrow). Similarly, during an interval in which the rotational angle $\theta$ of the rotor 11 assumes an angle between $3\pi/4$ and $5\pi/4$, transistors Q4, Q8, and Q14 are turned ON, and a current $I_2$ shown in FIG. 3(C) flows through the coil $L_{20}$ in a reverse direction (a direction opposite to the direction of the arrow). During an interval in which the rotational angle $\theta$ of the rotor 11 assumes an angle between $5\pi/4$ and $7\pi/4$, transistors Q1, Q5, and Q11 are turned ON, and the current $I_1$ flows through the coil $L_{10}$ in a forward direction. Moreover, during an interval in which the rotational angle $\theta$ of the rotor 11 assumes an angle between $7\pi/4$ and $9\pi/4$, transistors Q2, Q6, and Q12 are turned ON, and the current $I_2$ flows through the coil $L_{20}$ in a forward direction.

Thus, in the conventional driving circuit shown in FIG. 2, the currents respectively flow through the coils $L_{10}$ and $L_{20}$ in the forward direction and reverse direction in an alternate manner, for every $\pi/2$ radians. Accordingly, compared to a conventional driving circuit of a type in which four stator coils shifted in phase by $\pi/2$ radians are connected in parallel between voltage source terminals and the currents flow in only one direction during an interval corresponding to an angle of approximately $\pi/2$ radians, the utilization efficiency of the coils is high and a large torque can be obtained according to the conventional driving circuit shown in FIG. 2. However, the conventional driving circuit shown in FIG. 2 requires the power transistors Q5 through Q8 and Q11 through Q14 through which large current flow, that is, a total of eight power transistors are needed. As a result, the need for so many power transistors made the circuit bulky, and the driving circuit could not be manufactured at low cost.

Further, the switching of the coil currents according to the output voltages of the Hall elements 15 and 16 will now be considered. In a case where the peak-to-peak value of the output voltage of the Hall element shown in FIG. 3(A) is relatively large in the range of 400 mV, the switching operations of the transistors Q1 through Q4 which constitute the differential switching circuit are carried out rapidly. Hence, the coil currents $I_1$ and $I_2$ become switched rapidly as shown in FIGS. 3(B) and 3(C). However, when the switching of the currents are carried out in such a rapid manner, the coils and the rotor vibrate and generate noise. Further, because the rotor will not rotate smoothly, if this D.C. commutatorless motor is used as a motor for a rotary drum in a video signal recording and reproducing apparatus, for example, a large amount of jitter components will be included in a signal reproduced by rotary video heads which are mounted on the rotary drum. If the output voltages of the Hall elements have large amplitudes, the coil currents which are switched will undergo a large change, and the smoothness of the rotor rotation will become even poorer.

Accordingly, in order to increase the degree of smoothness of the rotor rotation, it becomes necessary to set the output voltage amplitudes of the Hall elements so that these amplitudes are not excessively large. When Hall elements using indium antimonide (InSb) are employed as the Hall elements 15 and 16 and such Hall elements are driven by constant currents, these Hall elements will show a temperature characteristic wherein the output decreases by 2.5% with every rise of 1° in temperature. Hence, if the setting is made so that the output voltage amplitudes of these Hall elements do not becomes excessively large, the peak-to-peak values of the output voltages of the Hall elements will assume an exceedingly small value in the range of 120 mV, for example, when the motor is used under high ambient temperature conditions. In such a case where the motor is used under a high ambient temperature condition, the switching operation of the differential switching circuit which is constituted by the transistors Q1 through Q4 will not be carried out in a rapid manner.

Figure 4:
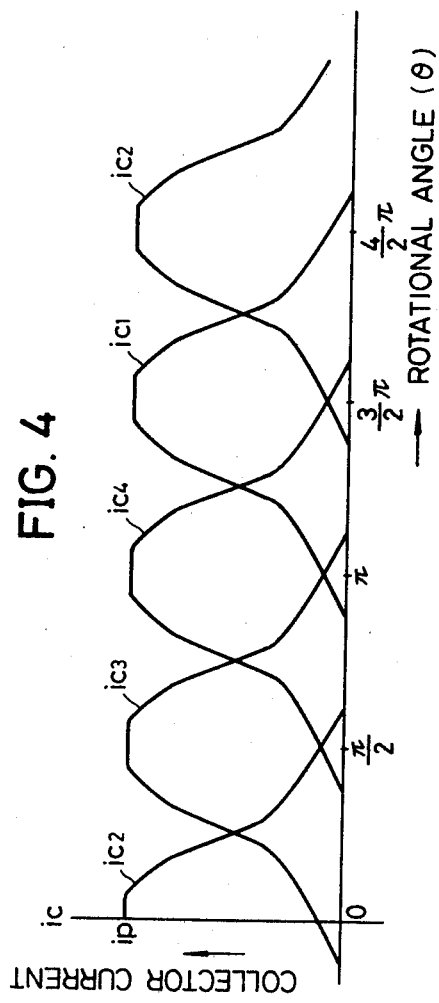
FIG. 4 is a graph showing signal waveforms of collector currents for explaining the operations of the conventional driving circuit and the driving circuit according to the present invention.

Therefore, among currents $i_{c1}$ through $i_{c4}$ flowing through the transistors Q1 through Q4, three of these currents will flow simultaneously at specific rotational angles of the rotor, as shown by overlapping parts in FIG. 4. For example, when the rotational angle $\theta$ of the rotor is equal to $\pi/2$ radians, the transistor Q3 is turned ON, and the collector current $i_{c3}$ flows. However, if it is assumed that $e_2$ (or $e_4$)$-e_3=60$ mV and $e_2=e_4$, the following equation (1) stands.

$$i_{c2} \approx i_{c4} \approx i_{c3}/10 \qquad (1)$$

Thus, the collector currents $i_{c2}$ and $i_{c4}$ which are in the range of 1/10 the collector current $i_{c3}$ of the transistor Q3, respectively flow through the transistors Q2 and Q4. In this state, the counterelectromotive force in the coil $L_{20}$ is zero, and for this reason, substantially equal currents flow through the transistors Q6, Q8, Q12, and Q14, that is, an emitter current $i_E$ flows through the transistors Q6, Q8, Q12, and Q14.

As described heretofore, according to the conventional driving circuit shown in FIG. 2, if the output voltage amplitudes of the Hall elements are small, the collector currents of the transistors flow simultaneously and the current $i_E$ flows where the rotational angle $\theta$ of the rotor is in the range of $\pi N/2$ (N=1, 2, ...). If the current $i_E$ is large, the power source current will become large, and the power source efficiency of the motor will become poor. In extreme cases, there was a disadvantage in that the power transistors Q5 through Q8 and Q11 through Q14 may become destroyed.

The present invention has overcome the disadvantages described heretofore, and an embodiment of the present invention will now be described in conjunction with FIG. 5.

Figure 5:
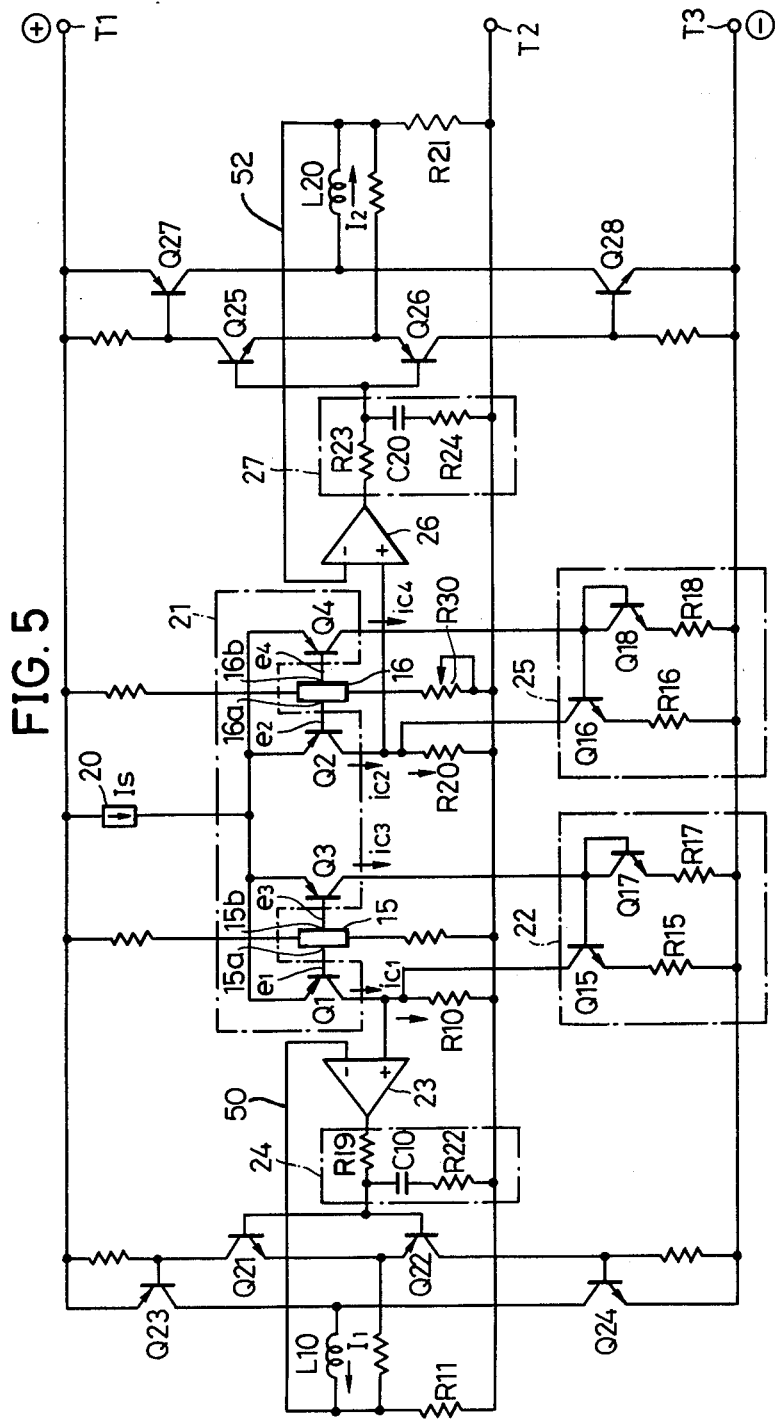
FIG. 5 is a circuit diagram showing an embodiment of a driving circuit for a D.C. commutatorless motor according to the present invention.

FIG. 5 shows a circuit diagram of an embodiment of a driving circuit for a D.C. commutatorless motor according to the present invention. In FIG. 5, those parts which are the same as those corresponding parts in FIG. 2 are designated by the same reference numerals. The mounting positions of the Hall elements 15 and 16 and the stator coils $L_{10}$ ($L_1$, $L_3$) and $L_{20}$ ($L_2$, $L_4$) are the same as in FIGS. 1A and 1B. The phase relationships between the output voltages $e_1$ through $e_4$ of the Hall elements 15 and 16 obtained through the voltage terminals 15a, 15b, 16a, and 16b are the same as in the conventional example shown in FIG. 3(A). In the driving circuit for a D.C. commutatorless motor according to the present invention, the stator coils are urged by two power sources, that is, a positive power source and a negative power source. A terminal T1 is connected to the positive side of the positive power source, a terminal T3 is connected to the negative side of the negative power source, and a terminal T2 is connected to the negative side of the positive power source and the positive side of the negative power source, that is, the terminal T2 grounded.

The emitters of the transistors Q1, Q2, Q3, and Q4 are commonly connected, and a constant current source 20 is connected between the terminal T1 and a connection point where the emitters are commonly connected. A current $I_S$ flows from the constant current source 20. The amplitude of the current $I_S$ is controlled by a speed control signal which controls the rotational speed of the rotor 11. The transistors Q1 through Q4 constitute a differential switching circuit 21. Basically, when the four output voltages of the Hall elements 15 and 16 applied to the respective bases of the transistors Q1 through Q4 have sufficiently large amplitudes, only the transistor among the transistors Q1 through Q4 which is applied with the lowest voltage is turned ON, and the other three transistors are turned OFF.

The collectors of the transistors Q1 and Q3 are respectively connected to a current mirror circuit 22 comprising transistors Q15 and Q17 and resistors R15 and R17. A non-inverting input terminal of an operational amplifier 23 is connected to the collectors of the transistors Q1 and Q15 and a resistor R10. On the other hand, connector 50 connects an inverting input terminal of the operational amplifier 23 to the stator coil $L_{10}$ and a resistor R11. An output terminal of the operational amplifier 23 is connected to a phase compensation circuit 24 comprising resistors R19 and R22 and a capacitor C10. Phase compensation circuit 24 is a phase lag compensation circuit that avoids instability from the negative feedback to the inverting input of operational amplifier 23 from stator coil L10 in conductor 50 and the oscillations or degradation of transient response associated with such instability. The phase compensation circuit 24 is connected to the base of a transistor Q23 through a transistor Q21, and to the base of a transistor Q24 through a transistor Q22.

The collectors of the transistors Q2 and Q4 are connected to a current mirror circuit 25 comprising transistors Q16 and Q18 and resistors R16 and R18. Resistances of the resistors R15 through R18 respectively are approximately the same. A non-inverting input terminal of an operational amplifier 26 is connected to the collectors of the transistors Q2 and Q16 and a resistor R20. An inverting input terminal of the operational amplifier 26 is connected to the stator coil $L_{20}$ and a resistor R21 in conductor 52. An output terminal of the operational amplifier 26 is connected to a phase compensation circuit 27 comprising resistors R23 and R24 and a capacitor C20. The resistance of the resistor R20 is the same as that of the resistor R10. The phase compensation circuit 27 is connected to the base of a transistor Q27 through a transistor Q25, and to the base of a transistor Q28 through a transistor Q26.

The emitters of the power transistors Q23 and Q27 are respectively connected to the positive terminal T1 of the positive power source. The resistors R10, R11, R20, and R21 and the phase compensation circuit 24 are respectively connected to the ground terminal T2. Further, the emitters of the power transistors Q24 and Q28 and the current mirror circuits 22 and 25 are respectively connected to the negative terminal T3 of the negative power source. A variable resistor R30 is connected to a current terminal of the Hall element 16, in order to adjust the D.C. levels at the voltage terminals of the Hall elements 15 and 16.

When currents are supplied to the current terminals of the Hall elements 15 and 16 and the rotor 11 is rotating, the Hall output voltages $e_1$ through $e_4$ shown in FIG. 3(A) are respectively obtained through the voltage terminals 15a through 16b. If the peak-to-peak values of these Hall output voltages are sufficiently large, in the range of 400 mV for example, the transistors Q1 through Q4 constituting the differential switching circuit 21 operate so that a current flows in each of the transistors during an interval corresponding to an angle of $\pi/2$ radians and sucessive ones of the transistors are sequentially turned ON.

For example, during an interval in which the rotational angle of the rotor 11 is in the range of $5\pi/4$ to $7\pi/4$, the voltage $e_1$ assumes the lowest voltage, and the transistor Q1 is accordingly turned ON. Thus, a voltage R10$I_S$ is introduced between the terminals of the resistor R10. In this state, a positive voltage is produced through the output terminal of the operational amplifier 23, and the transistor Q21 is turned ON and the transistor Q23 is turned ON as a result.

The high gain inherent of an operational amplifier requires that the error signal be essentially zero, i.e. that the feedback at the inverting input equal the input signal applied to the non-inverting input. The voltage at the common junction of stator coil L10 and resistor R11, connected by conductor 50 to the inverting input of operational amplifier, must therefore equal the voltage at the upper end of resistor R10. The lower ends of resistors R10 and R11 are tied to the ground terminal T2. Thus, the voltage V10 across resistor R10 must equal voltage V11 across resistor R11 or $$V10 = V11$$

The voltage V10 across resistor R10 is approximately equal to R10·$I_S$. The voltage V11 is approximately equal to R11 $I_1$. The current $I_1$ is the current through stator coil L10. Thus $$R10·I_S \simeq R11·I_1 \text{ or}$$

$$I_1 \simeq R10·I_S/R11$$

When the current $I_S$ of the current source 20 fluctuates or the rotor 11 is rotating, a voltage is induced between the terminals of stator coil L10. However, since the voltage on resistor R11 is held by the operation of operational amplifier 23, the voltage induced in stator coil L10 is reflected in the emitter-collector circuit of transistor Q23 so that the relationship expressed in the above equation stands.

During an interval in which the rotational angle of the rotor 11 is in the range of $\pi/4$ to $3\pi/4$ radians, the voltage $e_3$ assumes the lowest voltage, and the transistor Q3 is accordingly turned ON. Thus, the current $I_S$ flows through the transistor Q3. As a result, the current mirror circuit 22 operates, and substantially same currents, that is, the current $I_S$ flows through the collectors of the transistors Q15 and Q17. Hence, the voltage between the terminals of the resistor R10 becomes equal to $-R10I_S$. In this state, a negative voltage is produced through the output terminal of the operational amplifier 23, and the transistor Q22 is turned ON and the transistor Q24 is accordingly turned ON. On the other hand, the voltage between the terminals of the resistor R11 also becomes equal to $-R10I_S$. Therefore, the current $I_1$ described by the following equation flows through the coil L10.

$$I_1 \simeq -R10·I_S/R11$$

Similarly, during an interval in which the rotational angle of the rotor 11 is in the range of $(2\pi - \pi/4)$ to $(2\pi + \pi/4)$ radians, the transistors Q2, Q25, and Q27 are turned ON. Moreover, the voltage between the terminals of the resistor R20 and the voltage between the terminals of the resistor R21 respectively become equal to R20$I_S$. As a result, the current $I_2$ described by the following equation flows through the coil L20.

$$I_2 \simeq R20·I_S/R21$$

During an interval in which the rotational angle of the rotor 11 is in the range of $(\pi - \pi/4)$ to $(\pi + \pi/4)$ radians, the transistors Q4, Q26, and Q28 are turned ON. Further, the voltage between the terminals of the resistor R20 and the voltage between the terminals of the resistor R21 respectively become equal to $-R20I_S$. As a result, the current $I_2$ described by the following equation flows through the coil L20.

$$I_2 \simeq -R20·I_S/R21$$

Because the resistances of the resistors R11 and R21 are set to the same value, the currents $I_1$ and $I_2$ become the same as the currents shown in FIGS. 3(B) and 3(C) wherein the amplitudes of these currents $I_1$ and $I_2$ are equal.

Next, description will be given with respect to a case where the peak-to-peak values of the Hall output voltages are small and are in the range of 120 mV. In this case, the collector currents $i_{c1}$ through $i_{c4}$ of the transistors Q1 through Q4 become the same as those currents shown in FIG. 4.

If the rotational angle $\theta$ of the rotor 11 is equal to $\pi/2$ radians, for example, the collector current $i_{c3}$ (having a maximum value of $i_p$) flows through the transistor Q3 as seen from the equation (1) given before, and in addition, the currents $i_{c2}$ and $i_{c4}$ having amplitudes corresponding to $i_{c3}/10$ ($i_p/10$) respectively flow through the transistors Q2 and Q4. Thus, the current $I_S$ in this state can be described by the following equation.

$$I_S = i_p + 2i_p/10$$

In this state, the same current $i_{c3}$ flowing through the transistor Q17 flows through the transistor Q15 in the current mirror circuit 22. Hence, a current $I_{R10}$ flowing through the resistor R10 can be described by the following equation.

$$I_{R10} = i_{c1} - i_{c3}$$

Therefore, a voltage $V_{10}$ between the terminals of the resistor R10 can be described by the following equation.

$$V_{10} = R10(i_{c1} - i_{c3})$$
$$\simeq -R10 \cdot i_p$$

On the other hand, when the rotational angle $\theta$ of the rotor 11 is equal to $\pi/2$ radians, the currents $i_{c2}$ and $i_{c4}$ flowing through the transistors Q16 and Q18 in the current mirror circuit 25 are equal to each other. Thus, a current $I_{R20}$ flowing through the resistor R20 can be described by the following equation.

$$I_{R20} = i_{c2} - i_{c4}$$

A voltage $V_{20}$ between the terminals of the resistor R20 can hence by described by the following equation.

$$V_{20} = R_{20}(i_{c2} - i_{c4})$$

However, since $i_{c2} = i_{c4}$ in this case, the voltage $V_{20}$ becomes equal to zero. Accordingly, the output voltage of the operational amplifier 26 becomes equal to zero, and the voltage between the terminals of the resistor R21 becomes equal to zero. Thus, the transistors Q25 through Q28 are turned OFF, and the current $I_2$ flowing through the coil $L_{20}$ becomes equal to zero as shown in FIG. 6.

Further analysis can be made in a similar manner. When the rotational angle $\theta$ is equal to $\pi$ radians, the voltage $V_{10}$ becomes equal to zero, and the current $I_1$ flowing through the coil $L_{10}$ becomes equal to zero. When the rotational angle $\theta$ is equal to $3\pi/2$ radians, the voltage $V_{20}$ becomes equal to zero, and the current $I_2$ flowing through the coil $L_{20}$ becomes equal to zero. As a result, when the rotational angle $\theta$ is equal to $\pi N/2$ (N is an integer) radians, a maximum current flows through the coil $L_{10}$ (or the coil $L_{20}$) while no current flows through the coil $L_{20}$ (or the coil $L_{10}$), and the angle corresponding to the interval in which a current flows through one of the transistors Q23, Q24, Q27, and Q28 does not become larger than $\pi$ radians.

Figure 6:
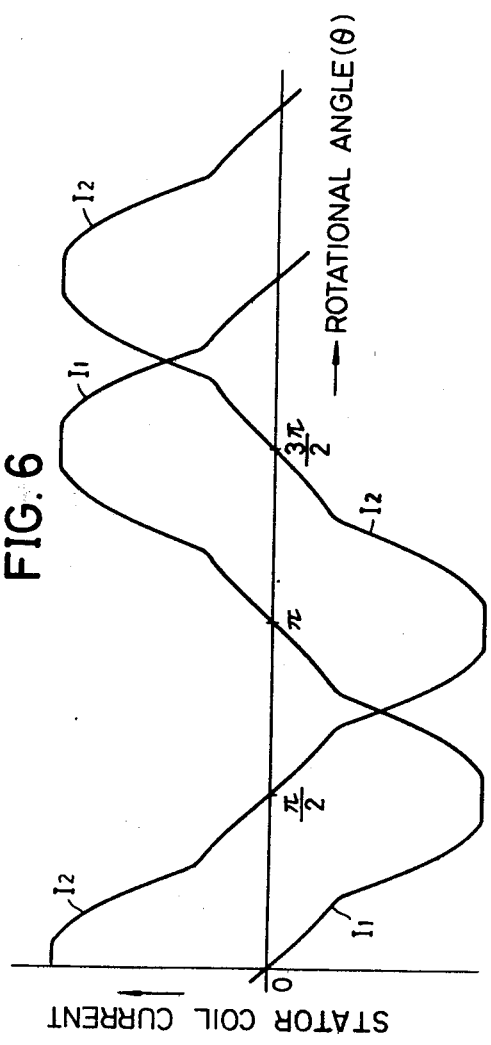
FIG. 6 is a graph showing signal waveforms of stator coil currents for explaining the operation of the driving circuit according to the present invention.

By suitably selecting the current waveforms shown in FIGS. 4 and 6 and the shape of the the magnetized rotor magnet, it is possible to reduce the irregularity in the torque introduced with the period of the current switching.

According to the driving circuit of the present invention, only four power transistors Q23, Q24, Q27, and Q28 are needed, and the number of power transistors required is ½ the number required in the conventional driving circuit. Thus, the circuit as a whole may be downsized, and the cost of the circuit may be reduced. In addition, the problems introduced in the conventional driving circuit are not introduced in the driving circuit according to the present invention, even if the outputs of the Hall elements are small. Therefore, the control currents for controlling the Hall elements may be small. Moreover, it is possible to employ Hall elements using gallium arsenide (GaAs) which shows a satisfactory temperature characteristic but can only produce output voltages in the range of ⅓ those obtained by Hall elements using indium antimonide (InSb). In addition, the generation of noise and vibrations is exceedingly small according to the present invention, because the current switching is carried out smoothly with respect to the stator coils.

Further, the present invention is not limited to these embodiments, but various variations and modifications may be made without departing from the scope of the present invention.

What is claimed is:

1. A driving circuit for a D.C. commutatorless motor comprising:
    a rotor having a permanent magnet;
    first and second Hall elements separated by approximately $\pi/2 \times (2N+1)$ radians in electrical angle, where N is an integer, for detecting a rotational angle of said rotor according to a magnetic field formed by the permanent magnet of said rotor;
    two stator coils separated by approximately $\pi/2 \times (2N+1)$ radians in electrical angle, successively switched and supplied with currents according to four output signals having a difference of approximately $\pi/2$ radians in phase obtained from said first and second Hall elements;
    power source means comprising a positive power source terminal and a negative power source terminal;
    power switching elements, each of said stator coils having one terminal thereof grounded and having the other terminal thereof coupled to the positive power source terminal of said power source means through one of said power switching elements and to the negative power source terminal of said power source means through another power switching element;
    a differential switching circuit for switching each of output terminals of said first and second Hall elements with a difference of approximately $\pi/2$ radians in phase by an output signal thereof; and
    a difference signal producing circuit coupled between said power switching elements and said differential switching circuit, for producing a signal in accordance with a difference between two output signals having a difference of approximately $\pi$ radians in phase obtained from said differential switching circuit,
    a current in accordance with the signal from said difference signal producing circuit being applied to respective stator coils.

2. A driving circuit as claimed in claim 1 in which said stator coils consist of first and second stator coils; said power switching elements comprise first and second power transistors respectively coupled between said first stator coil and said positive and negative power source terminals, and third and fourth power transistors respectively coupled between said second stator coil and said positive and negative power source terminals; and said difference signal producing circuit comprises a first operational amplifier having its inverting input terminal coupled to one terminal of said first stator coil, its non-inverting input terminal coupled to said differential switching circuit, and its output terminal coupled to bases of said first and second power transistors, and a second operational amplifier having its inverting input terminal coupled to one terminal of said second stator coil, its non-inverting input terminal coupled to said differential switching circuit, and its output terminal coupled to bases of said third and fourth power transistors.

3. A driving circuit as claimed in claim 2 which further comprises first and second resistors respectively having one terminal thereof coupled to said differential switching circuit and the other terminal thereof coupled to ground, and first and second current mirror circuits respectively coupled between said differential switching circuit and said negative power source terminal.

4. A driving circuit as claimed in claim 2 which further comprises a first phase compensation circuit coupled between the output terminal of said first operational amplifier and said first and second power transistors, and a second phase compensation circuit coupled between the output terminal of said second operational amplifier and said third and fourth power transistors.

5. A driving circuit as claimed in claim 1 which further comprises a constant current circuit coupled between said differential switching circuit and said positive power source terminal.

* * * * *